US011538139B2

(12) United States Patent
Jee et al.

(10) Patent No.: US 11,538,139 B2
(45) Date of Patent: Dec. 27, 2022

(54) METHOD AND APPARATUS WITH IMAGE PROCESSING

(71) Applicants:Samsung Electronics Co., Ltd., Suwon-si (KR); Industry-Academic Cooperation Foundation, Yonsei University, Seoul (KR)

(72) Inventors: Seunghoon Jee, Seoul (KR); Moon Gi Kang, Seoul (KR); Soon Young Hong, Seoul (KR); Min Sub Kim, Seoul (KR); Sang Yoon Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 113 days.

(21) Appl. No.: 16/951,290

(22) Filed: Nov. 18, 2020

(65) Prior Publication Data

US 2022/0044364 A1 Feb. 10, 2022

(30) Foreign Application Priority Data

Aug. 7, 2020 (KR) ........................ 10-2020-0099231

(51) Int. Cl.
*G06T 5/00* (2006.01)
*G06T 7/13* (2017.01)
(Continued)

(52) U.S. Cl.
CPC ........... *G06T 5/003* (2013.01); *G05D 1/0253* (2013.01); *G06T 5/20* (2013.01); *G06T 5/50* (2013.01);
(Continued)

(58) Field of Classification Search
CPC .. G06T 5/003; G06T 5/20; G06T 5/50; G06T 7/13; G06T 2207/20212;
(Continued)

(56) References Cited

U.S. PATENT DOCUMENTS 5,325,449 A * 6/1994 Burt ....................... H04N 19/23
348/E7.086
8,340,461 B2 12/2012 Sun et al.
(Continued)

FOREIGN PATENT DOCUMENTS

CN 102542260 A * 7/2012
KR 10-2013-0031574 A 3/2013
(Continued)

OTHER PUBLICATIONS

Xiaogang Zhang, et al., "Fast Image Dehazing Using Joint Local Linear SURE-based Filter and Image Fusion", IEEE, Apr. 24-26, 2015 (Year: 2015).*
(Continued)

*Primary Examiner* — Mekonen T Bekele
(74) *Attorney, Agent, or Firm* — NSIP Law

(57) ABSTRACT

An image processing method includes: determining a source transmission map based on a dark channel map of an input image; determining transformed transmission maps by applying different filters to the determined source transmission map; generating haze-free images by removing haze from the input image based respectively on the determined transformed transmission maps; and generating an output image by blending the generated haze-free images.

20 Claims, 12 Drawing Sheets

(51) Int. Cl.
*G05D 1/02* (2020.01)
*G06T 5/20* (2006.01)
*G06T 5/50* (2006.01)

(52) U.S. Cl.
CPC ....... *G06T 7/13* (2017.01); *G05D 2201/0213* (2013.01); *G06T 2207/20212* (2013.01); *G06T 2207/30252* (2013.01)

(58) Field of Classification Search
CPC . G06T 2207/30252; G06T 2207/20192; G06T 2207/20221; G06T 5/002; G06T 5/006; G06T 2207/20024; G05D 1/0253; G05D 2201/0213
See application file for complete search history.

(56) References Cited

U.S. PATENT DOCUMENTS

| | | | |
|---|---|---|---|
| 9,197,789 B2 | 11/2015 | Mukhopadhyay et al. | |
| 9,361,670 B2 | 6/2016 | Huang et al. | |
| 10,026,160 B2 | 7/2018 | Shah et al. | |
| 10,477,128 B2 | 11/2019 | Bhutani et al. | |
| 10,560,673 B2 | 2/2020 | Ryu et al. | |
| 2010/0142790 A1* | 6/2010 | Chang | G06T 5/002 382/274 |
| 2011/0221906 A1* | 9/2011 | Xu | G06T 7/0004 348/148 |
| 2018/0198998 A1 | 7/2018 | Bhutani et al. | |

FOREIGN PATENT DOCUMENTS

| | | |
|---|---|---|
| KR | 10-1394361 B1 | 5/2014 |
| KR | 10-1470833 B1 | 12/2014 |
| KR | 10-1689562 B1 | 12/2016 |
| KR | 10-1746712 B1 | 6/2017 |
| KR | 10-2018-0112335 A | 10/2018 |
| KR | 10-1997866 B1 | 7/2019 |
| KR | 10-2096356 B1 | 4/2020 |
| KR | 10-2104403 B1 | 4/2020 |

OTHER PUBLICATIONS

He, Kaiming et al., "Single Image Haze Removal Using Dark Channel Prior", *IEEE transactions on pattern analysis and machine intelligence*, 33, 12, 2010 (pp. 2341-2353).

EESR issued on Jun. 18, 2021 from the EPO in counterpart EP application No. 21152717.1 (8 pages in English).

Jing-Ming Guo et al., "An Efficient Fusion-Based Defogging", IEEE Transactions on Image Processing, vol. 26, No. 9, Sep. 2017.

Xiaogang Zhang et al., "Fast Image Dehazing Using Joint Local Linear SURE-based Filter and Image Fusion", 2015 5th International Conference on Information Science and Technology (ICIST).

* cited by examiner

METHOD AND APPARATUS WITH IMAGE PROCESSING

CROSS-REFERENCE TO RELATED APPLICATIONS

This application claims the benefit under 35 USC § 119(a) of Korean Patent Application No. 10-2020-0099231 filed on Aug. 7, 2020, in the Korean Intellectual Property Office, the entire disclosure of which is incorporated herein by reference for all purposes.

BACKGROUND

1. Field

The following description relates to a method and apparatus with image processing.

2. Description of Related Art

Advanced driver assistance systems (ADAS) may enhance safety and convenience for drivers by implementing sensors provided inside or outside a vehicle. The ADAS may assist a driver by detecting objects and alerting the driver of hazardous road conditions. In addition, a vehicle camera may function as the eyes of a vehicle. A vehicle camera may recognize road condition information including, for example, road signs, lanes, other vehicles, and the like, while a vehicle is traveling and generate data with the recognized road condition information, thereby assisting an ADAS with operating smoothly. While the vehicle is traveling, images may be obtained in various environments. However, in a poor environment (for example, in case of occurrence of an issue such as a loss of detailed information of an image due to brightness saturation and locally degraded brightness), a typical ADAS and/or vehicle camera may not effectively perform an additional image reprocessing technology for the stable provision of road condition information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method includes: determining a source transmission map based on a dark channel map of an input image; determining transformed transmission maps by applying different filters to the determined source transmission map; generating haze-free images by removing haze from the input image based respectively on the determined transformed transmission maps; and generating an output image by blending the generated haze-free images.

The transformed transmission maps and the haze-free images may be based on a size of a single mask of the source transmission map.

The filters may include: a first filter configured to restore a texture; and a second filter configured to suppress a halo artifact.

The first filter may include a multi-directional kernel-based filter, and the second filter may include a guided filter.

The generating of the output image may include: determining a blending weight based on edges in the input image; and generating the output image by blending the haze-free images based on the determined blending weight.

The haze-free images may include: a first haze-free image for determining a flat region of the output image; and a second haze-free image for determining a strong edge region of the output image.

The first haze-free image may include the flat region including a restored texture; and the second haze-free image may include the strong edge region including a suppressed halo artifact.

The generating of the output image may include: determining an edge map by detecting an edge in the input image; and blending the first haze-free image and the second haze-free image based on the determined edge map.

The blending may include blending the first haze-free image and the second haze-free image by assigning a greater weight to an edge region in the second haze-free image than a weight assigned to the edge region in the first haze-free image, wherein the edge region is determined based on the edge map.

The blending may include: generating first transformed haze-free images of different scales by performing a pyramid transformation on the first haze-free image; generating second transformed haze-free images of different scales by performing a pyramid transformation on the second haze-free image; and generating blended intermediate images by blending the first transformed haze-free images and the second transformed haze-free images based on the edge map.

The generating of the output image may include generating the output image by performing an inverted pyramid transformation on the blended intermediate images.

The determining of the edge map may include determining the edge map by performing a morphological operation on the detected edge of the input image.

A non-transitory computer-readable storage medium may store instructions that, when executed by a processor, configure the processor to perform the method.

In another general aspect, an image processing apparatus includes: a processor configured to: determine a source transmission map based on a dark channel map of an input image; determine transformed transmission maps by applying different filters to the determined source transmission map; generate haze-free images by removing haze from the input image based respectively on the determined transformed transmission maps; and generate an output image by blending the generated haze-free images.

The transformed transmission maps and the haze-free images may be based on a size of a single mask of the source transmission map.

The filters may include: a multi-directional kernel-based filter configured to restore a texture; and a guided filter configured to suppress a halo artifact.

For the generating of the output image, the processor may be configured to: determine a blending weight based on edges in the input image; and generate the output image by blending the haze-free images based on the determined blending weight.

For the determining of the blending weight, the processor may be configured to: detect an edge in the input image; and determine the blending weight by performing a morphological operation on the detected edge.

The apparatus may include: a camera configured to generate the input image; and a control system configured to control a vehicle based on a generated control instruction, wherein the processor may be configured to generate the control instruction based on the generated output image, and the apparatus is a vehicle control apparatus.

The apparatus may include a memory storing instructions that, when executed by the processor, configure the processor to perform the determining of the source transmission map, the determining of the transformed transmission maps, the generating of the haze-free images, and the generating of the output image.

In another general aspect, a vehicle control apparatus includes: a camera configured to generate an input image of surroundings of a vehicle; a processor configured to determine a source transmission map based on a dark channel map of the input image, determine transformed transmission maps by applying different filters to the determined source transmission map, generate haze-free maps by removing haze from the input image based respectively on the determined transformed transmission maps, generate an output image by blending the generated haze-free images, and generate a control instruction for traveling of the vehicle based on the generated output image; and a control system configured to control the vehicle based on the generated control instruction.

The filters may include: a multi-directional kernel-based filter configured to restore a texture; and a guided filter configured to suppress a halo artifact.

For the generating of the output image, the processor may be configured to: determine a blending weight based on edges in the input image; and generate the output image by blending the haze-free images based on the determined blending weight.

In another general aspect, an image processing method includes: determining a source transmission map, based on a dark channel map of an input image generated based on a mask of a predetermined size; determining first and second transformed transmission maps by respectively applying a multi-directional kernel-based filter and a guided filter to the source transmission map; generating first and second haze-free images by removing haze from the input image based respectively on the first and second transformed transmission maps; and generating an output image by blending the first and second haze-free images based on an edge map of the input image.

Other features and aspects will be apparent from the following detailed description, the drawings, and the claims.

Figure 1:
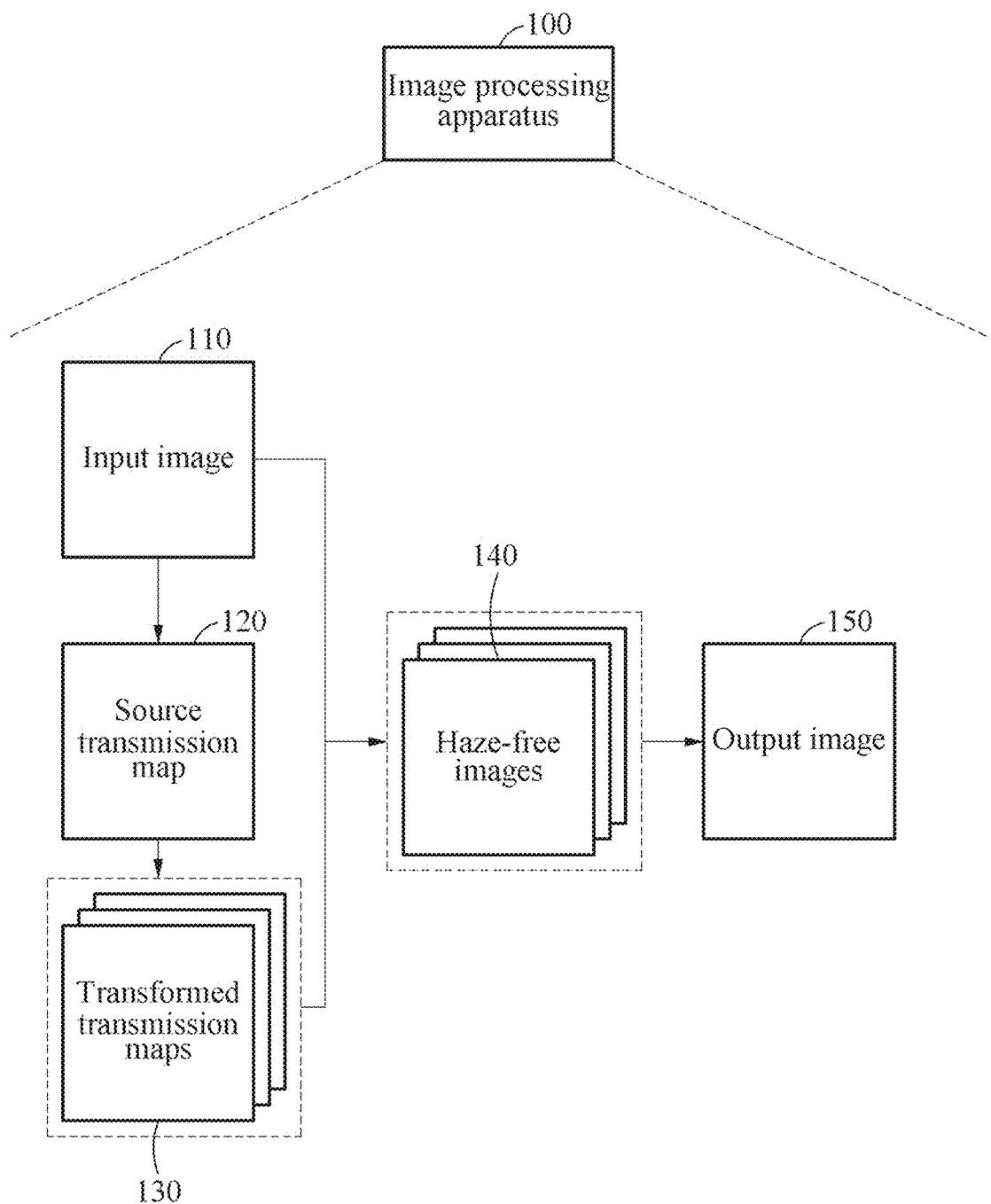
FIG. 1 illustrates an example of removing haze from an input image.

Throughout the drawings and the detailed description, unless otherwise described or provided, the same reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The term used in the embodiments such as "unit", etc., indicates a unit for processing at least one function or operation, and where the unit is hardware or a combination of hardware and software. The use of the term "may" herein with respect to an example or embodiment (for example, as to what an example or embodiment may include or implement) means that at least one example or embodiment exists where such a feature is included or implemented, while all examples are not limited thereto.

In addition, terms such as first, second, A, B, (a), (b), and the like may be used herein to describe components. Each of these terminologies is not used to define an essence, order, or sequence of a corresponding component but used merely to distinguish the corresponding component from other component(s). Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of removing haze (e.g., haze, fog, mist, and/or other similar atmospheric phenomena) from an input image. Referring to FIG. 1, an image processing apparatus 100 may obtain an input image 110. For example, the image processing apparatus 100 may receive the input image 110 from a camera (e.g., a camera included in the image processing apparatus 100 that captures the input image 110). The input image 110 may be a video image including a plurality of frames, or a still image corresponding to a single frame. The image processing apparatus 100 may generate an output image 150 by performing image processing on the input image 110. For example, the input image 110 may include a haze component, and the image processing may include removing the haze component. Thus, the input image 110 may also be referred to as a haze image.

In an example, the image processing apparatus 100 may remove haze from the input image 110 based on a dark channel prior (DCP) method. The DCP method may remove haze from the input image 110 using a dark channel map corresponding to the input image 110. The dark channel map may include a dark channel value of each pixel of the input image 110. For example, a dark channel value of one pixel may be determined to be a smallest value among pixel values of channels of the pixel and neighboring pixels. Hereinafter, a non-limiting example of deriving the dark channel map from an input image (e.g., the input image 110) will be described in further detail below with reference to FIG. 2.

In an example, the image processing apparatus 100 may use a single mask of a single size to perform the DCP method. The mask may refer to a window used to derive the dark channel value, and the mask may correspond to the dark channel map. However, when a typical image processing apparatus generates a single haze-free image using the single mask of the single size, a blocking artifact or edge degradation may occur. To prevent such artifacts, masks of multiple sizes may be used. However, even when the typical image processing apparatus uses the masks of the multiple sizes to perform the DCP method, the prevention of the blocking artifact may be limited, and there may be a lack of stability in blending intermediate outputs.

In contrast, for example, as illustrated in FIG. 1, the image processing apparatus 100 of one or more embodiments may generate a source transmission map 120 based on the input image 110 using a single mask of a single size, generate a plurality of transformed transmission maps 130 by performing post-processing on the source transmission map 120 using various filters, and generate the output image 150 by blending a plurality of haze-free images 140 generated based on the transformed transmission maps 130. In this example, the image processing apparatus 100 of one or more embodiments may perform a DCP method that is robust against edge information and prevents a blocking artifact by determining and selecting an effective combination of the filters and adjusting a blending weight to be determined as suitable for characteristics of the filters.

For example, the image processing apparatus 100 may derive the dark channel map corresponding to the input image 110 and determine the source transmission map 120 based on the dark channel map. Here, an inverse relationship may be established between the dark channel map and a transmission map. A dark channel value of the dark channel map may correspond to an amount of haze of the input image 110. A pixel including a greater number of haze components may have a greater dark channel value. A transmission value may refer to a rate at which light reflected by an object reaches a viewer through the atmosphere. Thus, a pixel of the input image 110 including a greater number of haze components may have a smaller transmission value in a corresponding pixel of the source transmission map 120. This is because a greater amount of haze may scatter a greater amount of light.

The image processing apparatus 100 may determine the transformed transmission maps 130 by applying the filters of different characteristics to the source transmission map 120. In such an example, a combination of filters having complementary characteristics may be selected as the filters to be applied from the filters of different characteristics. For example, a filter of a type specialized or configured to restore a texture (e.g., a texture of a region of the input image 110 degraded, or not included, in the source transmission map 120) and a filter of a type specialized or configured to suppress a halo artifact (e.g., a halo artifact generated in the source transmission map 120) may be selected and used to determine the transformed transmission maps 130. For convenience of description, the former filter (e.g., configured to restore the texture) may be referred to herein as a first filter, and the latter filter (e.g., configured to suppress the halo artifact) may be referred to herein as a second filter. In addition, the first filter may reduce a blocking artifact, and the second filter may reduce a blocking artifact and naturally express an edge. For example, the first filter may include a multi-directional kernel-based filter, and the second filter may include a guided filter. Hereinafter, a non-limiting example of deriving transformed transmission maps (e.g., the transformed transmission maps 130) will be described in further detail below with reference to FIG. 3.

The image processing apparatus 100 may generate the haze-free images 140 by removing haze from the input image 110 based respectively on the transformed transmission maps 130. For example, the image processing apparatus 100 may determine a first transformed transmission map among the transformed transmission maps 130 by applying the first filter to the source transmission map 120, and generate a first haze-free image among the haze-free images 140 based on the input image 110 and the first transformed transmission map. In addition, the image processing apparatus 100 may determine a second transformed transmission map among the transformed transmission maps 130 by applying the second filter to the source transmission map 120, and generate a second haze-free image among the haze-free images 140 based on the input image 110 and the second transformed transmission map. The transformed transmission maps 130 and the haze-free images 140 may be generated based on the source transmission map 120 through the single mask of the single size, and thus may be based on a size of the single mask.

The image processing apparatus 100 may generate the output image 150 by blending the haze-free images 140. The output image 150 may also be referred to herein as a blended image. The image processing apparatus 100 may determine a suitable blending weight based on the characteristics of the filters and/or features of the haze-free images 140. For example, when the first filter is specialized or configured to restore a texture, the first haze-free image generated using the first filter may have a great weight for a flat region (e.g., a region corresponding to a flat surface of the input image 110). However, the first filter may have a limit in suppressing a halo artifact in a strong edge region. In addition, when the second filter is specialized or configured to suppress a halo artifact, the second haze-free image generated using the second filter may have a great weight for such strong edge region. Thus, a multi-directional kernel-based technology (e.g., included in the first filter) which is effective in restoring an amount of information in a flat region, and a guided filter-based technology (e.g., included in the second filter) which is effective in removing a halo effect in a high-frequency region may be variably used depending on a region. In such a case, the image processing apparatus 100 may stably blend the haze-free images 140 using a blending method such as sub-band blending.

The output image 150 may be used for various image analyses. When haze is removed from the input image 110, an amount of information to be used for the analyses may be improved. For example, the output image 150 may be used as data for an advanced driver assistance systems (ADAS). In such a case, the image processing apparatus 100 may be provided in a front camera module of a vehicle. In this example, the ADAS may recognize road condition information (including, for example, signs, lanes, and other vehicles) during traveling of the vehicle using the output image 150, and control the vehicle based on the recognized road condition information. In addition or in another example, the output image 150 may be used for a computer vision field including, for example, object detection, separation, and recognition through, for example, a surveillance camera and a commercially used camera (e.g., a smartphone camera, a mirrorless camera, and a digital single-lens reflex [DSLR] camera), and the like.

Figure 2:
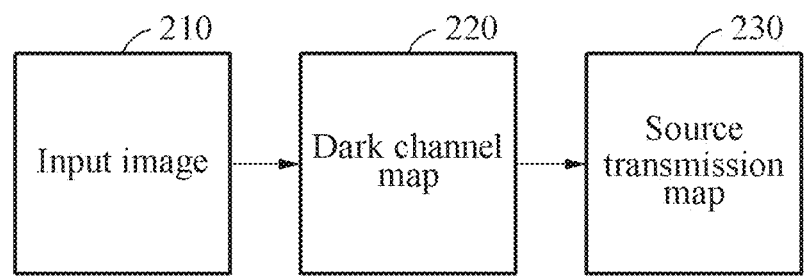
FIG. 2 illustrates an example of determining a source transmission map from an input image.

FIG. 2 is illustrates an example of determining a source transmission map from an input image. Referring to FIG. 2, an image processing apparatus (e.g., the image processing apparatus 100) may generate a dark channel map 220 corresponding to an input image 210 and determine a source transmission map 230 based on the generated dark channel map 220. When there is no haze, most of light reflected by an object may be sensed by a camera. However, when there is haze, a portion of light reflected by an object may be scattered by the haze, and ambient light may be reflected by the haze in a direction of the camera. Thus, the portion of the light reflected by the object and a portion of the ambient light may be sensed by the camera. Based on this, the influence of haze on an input image may be modeled as represented by Equation 1 below, for example.

$$I(x) = J(x) \cdot t(x) + A(1 - t(x))$$ Equation 1:

In Equation 1, I(x) denotes an input image, and x denotes a pixel index and is defined as a two-dimensional (2D) vector. J(x) denotes an image without being affected by haze. J(x) may also be referred to as a haze-removed image or a haze-free image. In addition, J(x) may be referred to as a radiance. t(x) denotes a medium transmission, which indicates a rate at which light reflected by an object reaches a camera through the air. t(x) may also be referred to as a transmission map. A denotes air-light.

Equation 1 may be transformed into Equation 2 below, for example. Referring to Equation 2, when 1(x) is given, J(x) may be obtained by estimating t(x) and A.

$$J(x) = \frac{I(x) - A}{t(X)} + A$$ Equation 2 t(x) may be estimated based on a dark channel. For example, the image processing apparatus 100 may estimate t(x) for each region of an image by estimating rough distance information through the dark channel. When a distance between an object and a camera increases, the influence of haze increases and the brightness of an image may increase accordingly, and the image processing apparatus 100 may estimate the distance information. The dark channel may be estimated as represented by Equation 3 below, for example.

$$D(x) = \min_{y \in \Omega(x)} \left( \min_{c \in \{R,G,B\}} I^c(y) \right)$$ Equation 3

In Equation 3, D(x) denotes a dark channel. I denotes an input image and C denotes channels (e.g., three channels of R, G, and B) of the input image. Ω(x) denotes a pixel region corresponding to a mask. y denotes pixels included in the mask. According to Equation 3 above, a dark channel D(x) of a pixel x may be determined to be a smallest value among pixel values of the channels of the pixels in the mask including the pixel x at a reference position (e.g., center). For example, a size of the mask may be set as 15×15, and an operation associated with Equation 3 may be performed repeatedly for each pixel position of each image. D(x) may have a value between 0 and 1. By inverting D(x) as represented by Equation 4 below, for example, t(x) may be obtained.

$$t(x) = 1 - D(x)$$ Equation 4:

In Equation 4, D(x) denotes a dark channel, and t(x) denotes a medium transmission. D(x) may correspond to the dark channel map 220, and t(x) may correspond to the source transmission map 230. The dark channel map 220 corresponding to the input image 210 may be determined based on Equation 3. The source transmission map 230 corresponding to the dark channel map 220 may be determined based on Equation 4. Subsequently, transformed transmission maps (e.g., the transformed transmission maps 130 of FIG. 1) corresponding to the source transmission map 230 may be determined, and then haze-free images (e.g., the haze-free images 140 of FIG. 1) may be generated by applying the transformed transmission maps to Equation 2 above. Here, A may be estimated through a known method. Hereinafter, a non-limiting example of generating haze-free images (e.g., the haze-free images 140) based on a source transmission map (e.g., either of the source transmission maps 120 and 230) will be further described in detail below with reference to FIGS. 3 through 5.

Figure 3:
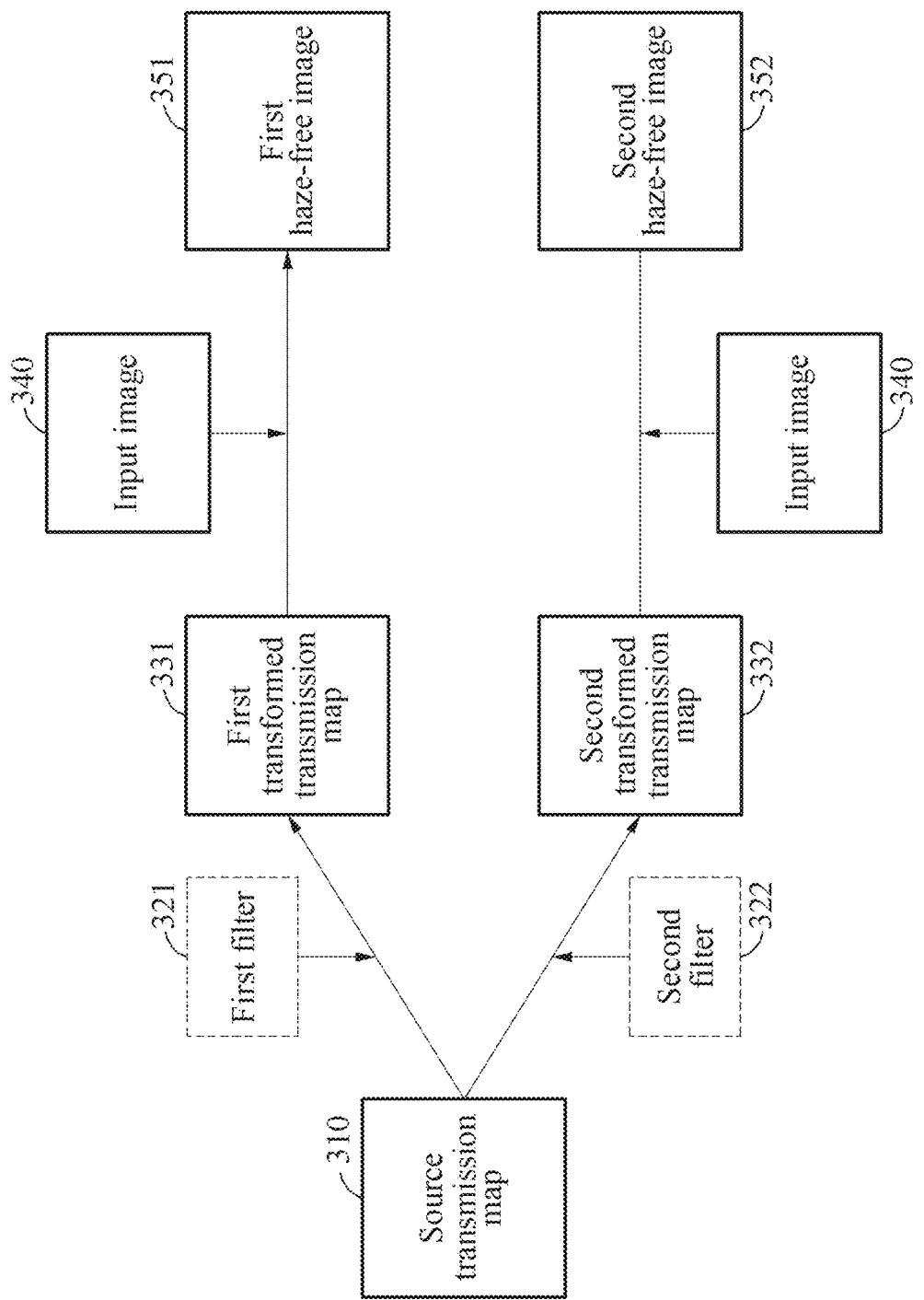
FIG. 3 illustrates an example of generating haze-free images from a source transmission map.

FIG. 3 illustrates an example of generating haze-free images from a source transmission map. Referring to FIG. 3, an image processing apparatus (e.g., the image processing apparatus 100) may generate a first transformed transmission map 331 by applying a first filter 321 to a source transmission map 310. For example, the first filter 321 may be a filter of a type specialized or configured to restore a texture. For example, the first filter 321 may be a multi-directional kernel-based filter. In an example, the first transformed transmission map 331 may be generated based on Equation 5 below.

$$\min_{\hat{t}} \frac{\lambda}{2} \| t - \hat{t} \|_2^2 + \sum_{j \in w} \| W_j \circ (D_j \otimes t) \|_1 \qquad \text{Equation 5}$$

In Equation 5, $\hat{t}$ denotes a transmission map in which edge information is restored and may correspond to the first transformed transmission map 331. t denotes a transmission map before the restoration and may correspond to the source transmission map 310. $D_j$ denotes a multi-directional kernel and $W_j$ denotes a weight of each kernel, in which j denotes the number of directions. For example, j=9 (including, for example, upper left, top, upper right, left, middle, right, lower right, bottom, and lower left). $\lambda$ denotes a regularizing parameter.

In an example, a small weight may be assigned to a relatively large edge region (e.g., a blocking artifact) and a great weight may be assigned to a relatively small edge region (e.g., where significant texture information is to be restored, such as a flat region), using a Gaussian function. For example, in a case in which an edge is present in a transmission map, whether the edge is an artifact generated by a mask or is edge information of an edge of an input image may be determined. In this example, when the edge is determined to be the artifact, the edge may be removed, and when the edge is determined to be the edge information, the edge may not be removed. Thus, a blocking artifact may be removed, and edge information of a haze image may be restored. Due to a characteristic of the first filter 321, detailed edge information may be effectively restored in a flat region. However, a halo effect may not be removed in an edge region having a similar intensity to an edge by the blocking artifact.

The image processing apparatus may also generate a second transformed transmission map 332 by applying a second filter 322 to the source transmission map 310. The second filter 322 may have a characteristic that complements the first filter 321. For example, the second filter 322 may be a filter of a type specialized or configured to suppress a halo artifact. For example, the second filter 322 may be a guided filter. In an example, the second transformed transmission map 332 may be generated based on Equation 6 below.

$$\hat{t}_k = a_k \cdot I_k + b_k \qquad \text{Equation 6:}$$

In Equation 6, $\hat{t}_k$ denotes a transmission map in which edge information is restored and may correspond to the second transformed transmission map 332. I denotes a haze image and may correspond to an input image 340. a and b corresponding to a mask denote constants corresponding to respective regions in the haze image. For example, a size of the mask may be 20*20. The mask described here may be different from that used when generating a dark channel. To distinguish these masks, the mask used for applying the guided filter may be referred to as a guided filter mask, and the mask used for deriving the dark channel may be referred to as a dark channel mask.

A guided kernel-based filter may estimate a linear regression parameter based on a local distribution of pixel values of a haze image using a linear regression method. The constants a and b having certain values for each mask may be linear regression parameters, which may be derived through linear regression as represented by Equation 7 below, for example.

$$\min_{a_k, b_k} \sum_{i \in w_k} \left( (a_k \cdot I_i + b_k - t_i)^2 + \epsilon a_k^2 \right) \qquad \text{Equation 7}$$

In Equation 7, k denotes a mask index and may correspond to a center pixel of a mask. $w_k$ denotes a kth mask. i denotes a pixel index of a pixel included in $w_k$. $I_i$ denotes a haze image, and c denotes a regulating parameter. $t_i$ denotes a transmission map before restoration and may correspond to the source transmission map 310. $a_k$ and $b_k$ may be respectively represented by Equations 8 and 9 below, for example.

$$a_k = \frac{\frac{1}{|w|} \sum_{i \in w_k} I_i p_i - \mu_k \bar{p}_k}{\sigma_k^2 + \varepsilon} \qquad \text{Equation 8}$$

$$b_k = \bar{p}_k - a_k \mu_k \qquad \text{Equation 9}$$

In Equations 8 and 9, p may correspond to the source transmission map 310 from which a noise effect is removed. $\bar{p}$ denotes a mean of p. $\mu$ and $\sigma_k^2$ denote a mean of a haze image and a variance of the haze image, respectively. 01 denotes the number of pixels corresponding to a mask. For example, p may be derived by applying a blur effect to t. When constants a and b are determined based on a similarity to the haze image, information of the haze image may be effectively used for a region having great edge information and applied to a transmission map. Thus, a halo effect may be effectively reduced in the region having the great edge information.

The image processing apparatus may determine the transformed transmission maps 331 and 332 by post-processing the source transmission map 310 using the two methods described above, respectively, and derive haze-free images 351 and 352 corresponding to the transformed transmission maps 331 and 332 based on Equation 2 above. For example, the image processing apparatus may apply the input image 340 as I(x) to Equation 2 and apply the first transformed transmission map 331 as t(x) to Equation 2, and thus obtain a first haze-free image 351 corresponding to J(x). In addition, the image processing apparatus may similarly apply the input image 340 and the second transformed transmission map 332 to Equation 2, and thus obtain a second haze-free image 352.

Figure 4:
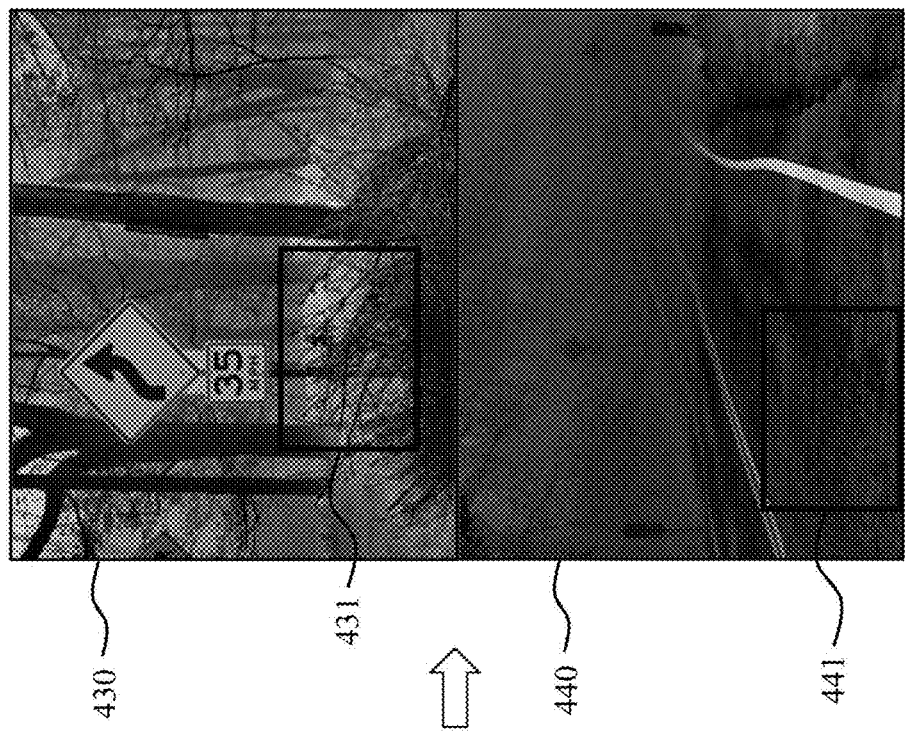
FIG. 4 illustrates an example haze-free image generated through a multi-directional kernel-based filter.
Figure 4:
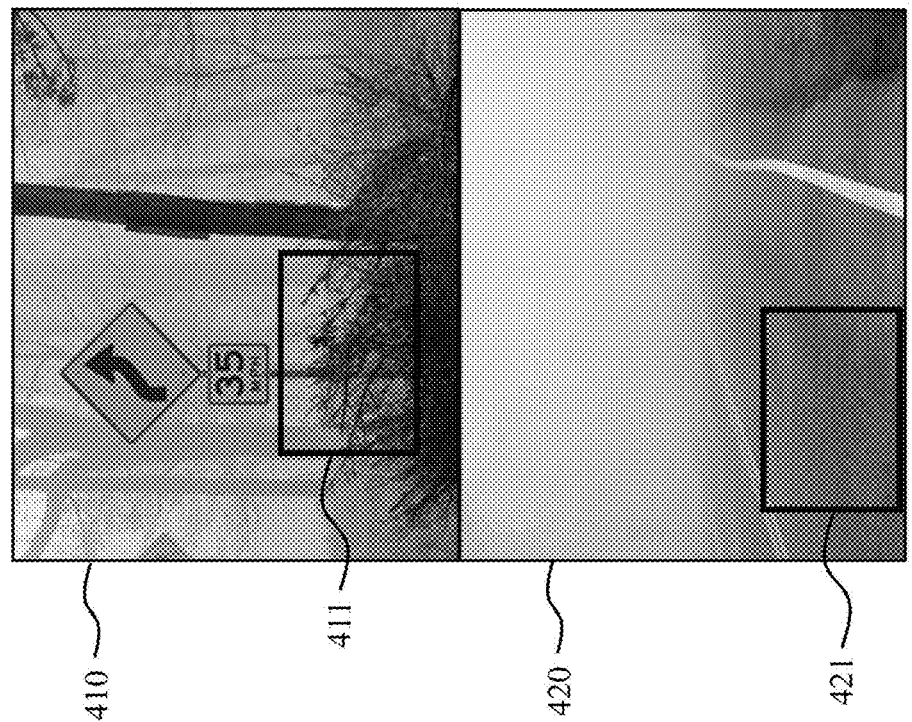
Figure 5:
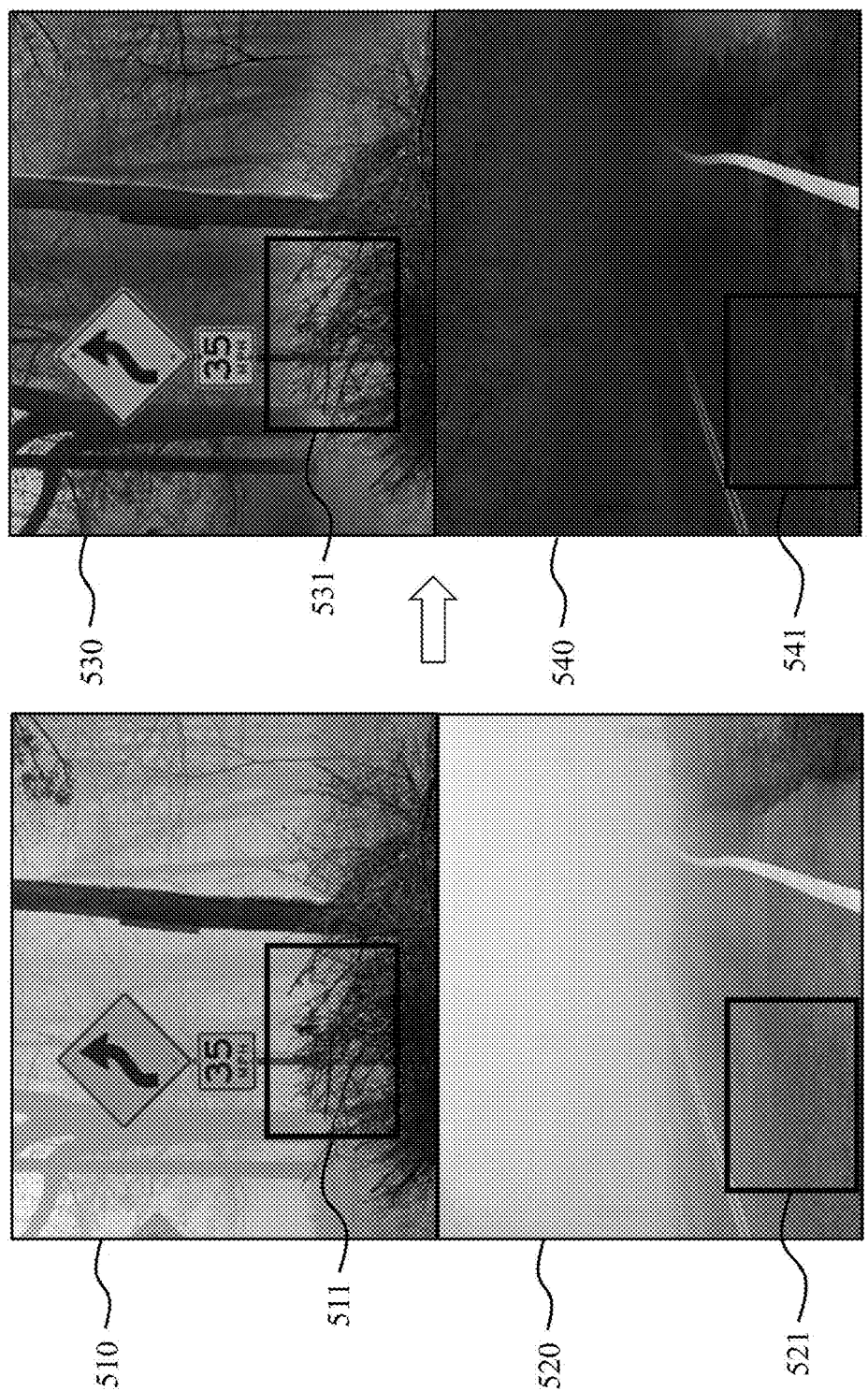
FIG. 5 illustrates an example haze-free image generated through a guided filter.

FIG. 4 illustrates an example haze-free image generated through a multi-directional kernel-based filter (e.g., a first filter). FIG. 5 illustrates an example haze-free image generated through a guided filter (e.g., a second filter). Referring to FIG. 4, haze-free images 430 and 440 respectively corresponding to input images 410 and 420 may be generated based on a multi-directional kernel-based filter and the respective input images 410 and 420. The input image 410 may include a strong edge region 411 and the input image 420 may include a flat region 421. As shown in the haze-free image 440, a texture of a flat region 441, corresponding to the flat region 421, is effectively restored through the multi-directional kernel-based filter. However, as shown in the haze-free image 430, that there still is a halo artifact in a strong edge region 431 corresponding to the strong edge region 411.

Referring to FIG. 5, haze-free images 530 and 540 respectively corresponding to input images 510 and 520 may be generated based on a guided filter and the respective input images 510 and 520. The input images 510 and 520 may further respectively correspond to the input images 410 and 420 of FIG. 4. The input image 510 may include a strong edge region 511, and the input image 520 may include a flat region 521. As shown in the haze-free image 530, a halo artifact of a strong edge region 531, corresponding to the strong edge region 511, is effectively removed through the guided filter. However, as shown in the haze-free image 540, texture information of a flat region 541, corresponding to the flat region 521, is lost.

Thus, by using an image generated through the multi-directional kernel-based filter for texture information and using an image generated through the guided filter for a strong edge, the image processing apparatus 100 of one or more embodiments may generate an output image that is robust against both the cases. Hereinafter, a non-limiting example of generating an output image (e.g., the output image 150) by blending images will be described in detail with reference to FIGS. 6 through 8.

Figure 6:
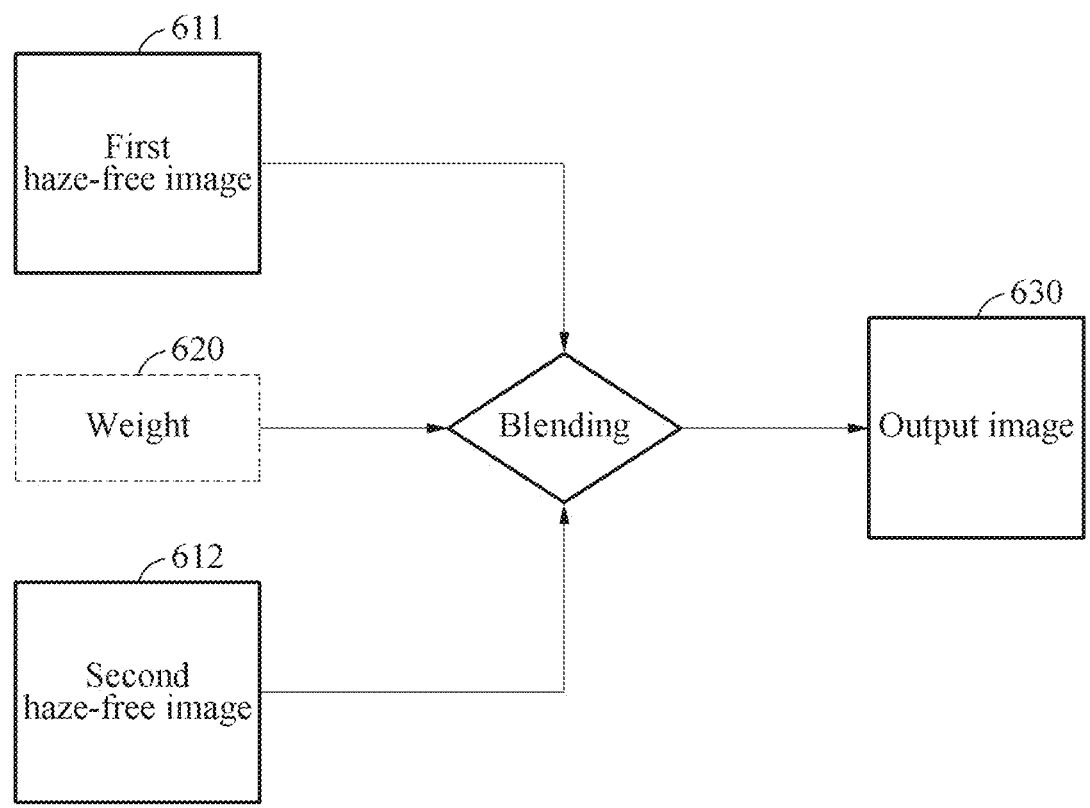
FIG. 6 illustrates an example of generating an output image using haze-free images.

FIG. 6 illustrates an example of generating an output image using haze-free images. Referring to FIG. 6, an image processing apparatus (e.g., the image processing apparatus 100) may generate an output image 630 by blending a first haze-free image 611 and a second haze-free image 612. In such a case, the image processing apparatus may blend the first haze-free image 611 and the second haze-free image 612 by applying a weight 620. The weight 620 may also be referred to herein as a blending weight. The haze-free images 611 and 612 may have respective strong points in different regions, and it may thus be effective to blend the haze-free images 611 and 612 by assigning the weight 620 according to their respective strong points. For example, the weights 620 may include a weight assigned In an example, the image processing apparatus may determine a blending weight based on edges in an input image and blend haze-free images (e.g., the haze-free images 611 and 612) based on the determined blending weight. For example, the first haze-free image 611 may be generated based on a first filter specialized or configured to restore a texture, and the second haze-free image 612 may be generated based on a second filter specialized or configured to suppress a halo artifact. In this example, the first haze-free image 611 may be used to generate the output image 630 for a flat region, and the second haze-free image 612 may be used to generate the output image 630 for a strong edge region.

In the example, to generate the output image 630, the image processing apparatus may determine an edge map by detecting an edge in the input image and blend the first haze-free image 611 and the second haze-free image 612 based on the determined edge map. For example, such edge detection may include Canny edge detection. The edge map may specify a strong edge region in a corresponding image. The first haze-free image 611 may have a strong point in restoring a texture of a flat region based on a characteristic of the first filter, and the second haze-free image 612 may have a strong point in suppressing a halo artifact in a strong edge region based on a characteristic of the second filter. That is, for example, more information of the texture of the flat region may be restored in the first haze-free image 611 than in the second haze-free image 612, and more information of the halo artifact in the strong edge region may be suppressed in the second haze-free image 612 than in the first haze-free image 611. Thus, the image processing apparatus may blend the first haze-free image 611 and the second haze-free image 612 by assigning a great weight to an edge region in the second haze-free image 612 corresponding to the edge map (e.g., a greater weight than a weight assigned to a corresponding edge region in the first haze-free image 611), and blending the first haze-free image 611 and the second haze-free image 612 based on the assigned great weight (and the assigned lesser weight).

In the example, the image processing apparatus may determine the edge map by detecting an edge in the input image and performing a morphological operation on the detected edge. For example, through the morphological operation, a narrow region corresponding to an edge line may be expanded to a wide region having a wider width than the edge line. In a case in which there is an edge in the second haze-free image 612, it may be effective to use the edge by a unit of a wide region expanded from a line in lieu of a unit a narrow line, in the process of blending. Thus, through the morphological operation, the image processing apparatus may expand a width of the edge. The morphological operation may be represented by Equation 10 below, for example.

$$E'(x) = \begin{cases} E(x), & \sum_{y \in \Omega} E(y) \geq 1 \\ 0, & \text{otherwise} \end{cases} \quad \text{Equation 10}$$

In Equation 10, E'(x) denotes an edge map obtained after the morphological operation is applied, and E(x) denotes an edge map before the application of the morphological operation. y denotes a position of a pixel corresponding to a mask Ω. For example, a size of the mask may be 5*5. In a case in which there is a region determined to be an edge inside the mask, an entire area of the mask may be substituted by a value that is same as the edge. Through such a process described above, an edge region may be expanded, and thus the image processing apparatus may maximize an effect of blending.

Figure 7:
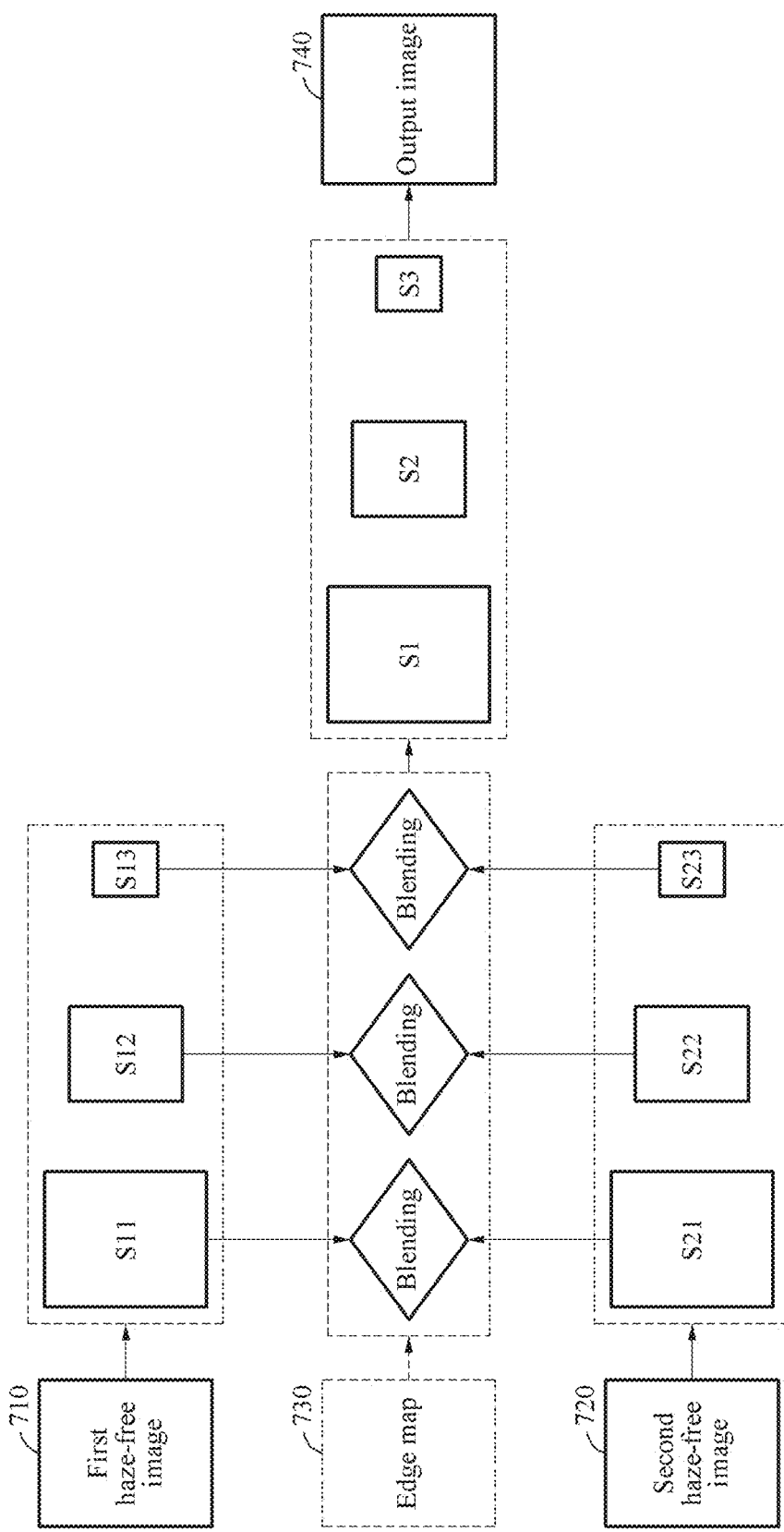
FIG. 7 illustrates an example of sub-band blending.

FIG. 7 illustrates an example of sub-band blending. In a case of image blending, there may be an unnatural result according to a blending method. For example, referring to FIG. 7, an edge map 730 may be generated through a morphological operation. In this example, when blending a first haze-free image 710 and a second haze-free image 720 using the generated edge map 730, an unnatural blending result may occur in a region in which a size of the edge map 730 changes drastically. In an example, through a blending method such as sub-band blending, the image processing apparatus may naturally blend images. The sub-band blending may refer to a method of blending images by classifying the images by frequency.

In an example, an image processing apparatus (e.g., the image processing apparatus 100) may perform Laplacian pyramid blending as the sub-band blending. The Laplacian pyramid blending may be represented by Equation 11 below, for example.

$$R'=L(R_1,R_2,E') \quad \text{Equation 11:}$$

In Equation 11, L denotes Laplacian pyramid blending for which three images $R_1$, $R_2$, and E' may be used as an input. $R_1$ and $R_2$ are a radiance obtained using a multi-directional kernel-based filter and a radiance obtained using a guided filter, respectively, and may correspond to the first haze-free image 710 and the second haze-free image 720, respectively. E' may correspond to the edge map 730 and be generated through a morphological operation. R' denotes a blended radiance and may correspond to an output image 740.

Referring to FIG. 7, the image processing apparatus may generate first transformed haze-free images S11, S12, and S13 of various scales by performing a pyramid transform on the first haze-free image 710. For example, the pyramid transform may include providing a blur effect to an image, downsampling a resultant image obtained from the blur effect, upsampling a resultant image obtained from the downsampling, and obtaining a Laplacian image corresponding to a difference between an initial image and a final resultant image. The first transformed haze-free images S11, S12, and S13 may correspond to Laplacian images generated by such a pyramid transform. The pyramid transform may also be performed on the second haze-free image 720, and second transformed haze-free images S21, S22, and S23 of various scales may thus be generated.

The image processing apparatus may generate blended images S1, S2, and S3 by blending the first transformed haze-free images S11, S12, and S13 and the second transformed haze-free images S21, S22, and S23 based on the edge map 730. The image processing apparatus may then generate the output image 740 by performing an inverted pyramid transform on the generated blended images S1, S2, and S3. Here, the blended images S1, S2, and S3 may also be referred to herein as intermediate blended images S1, S2, and S3.

Figure 8:
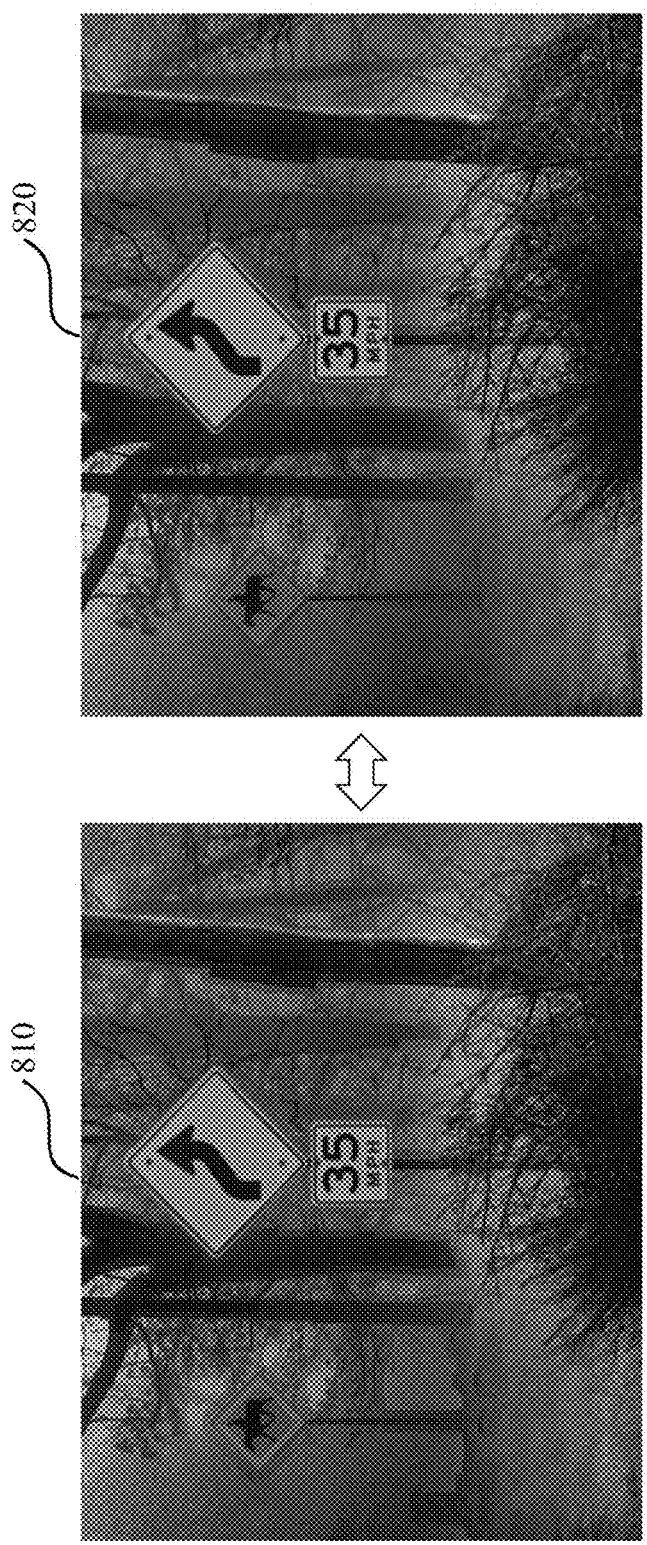
FIG. 8 illustrates an example image illustrating a comparison between simple blending and sub-band blending.

FIG. 8 illustrates a comparison between simple blending and sub-band blending. Referring to FIG. 8, an image 810 corresponds to a result of simple blending, and an image 820 corresponds to a result of Laplacian pyramid blending. As shown in the image 810, there is an unnatural blending result such as blocks or boundaries around an edge. However, as shown in the image 820, surroundings of the edge are expressed naturally. Such Laplacian sub-band blending of one or more embodiments may use multiple scales and variably apply a weight to a low-frequency region and a high-frequency region, and thus obtain a stable blending result, compared to a typical method of simply applying the weight to an original scale.

Figure 9:
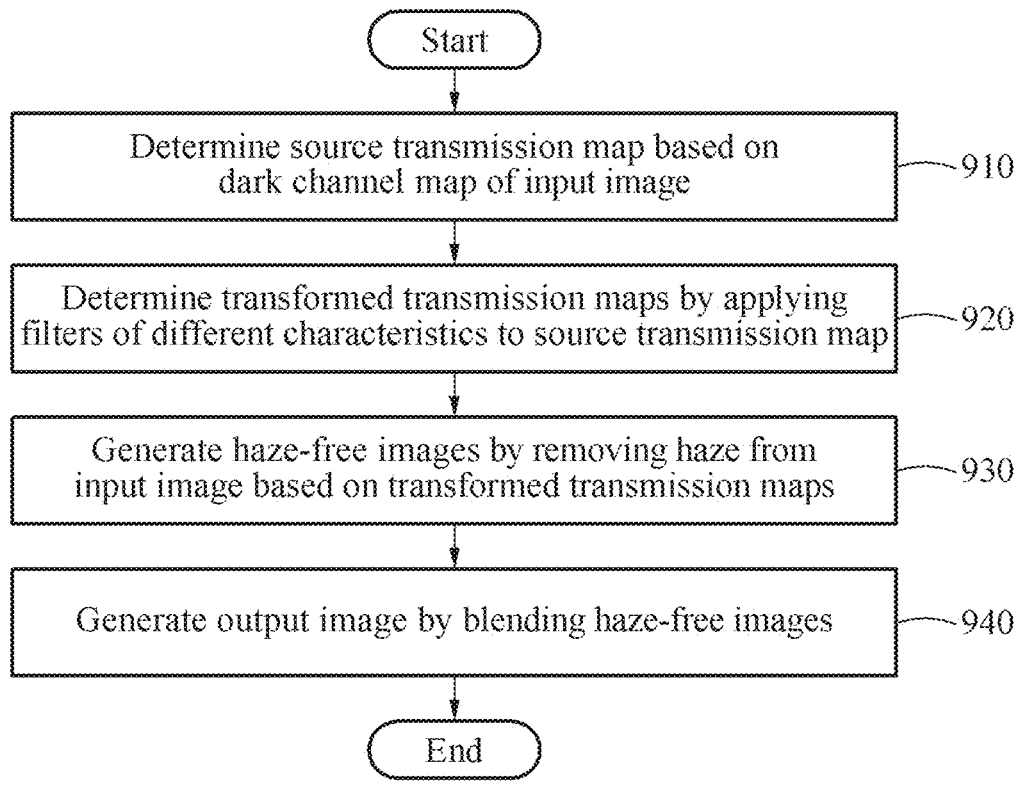
FIG. 9 illustrates an example of an image processing method for haze removal.

FIG. 9 illustrates an example of an image processing method for haze removal. Referring to FIG. 9, an image processing apparatus may determine a source transmission map based on a dark channel map of an input image in operation 910, determine transformed transmission maps by applying filters of different characteristics to the determined source transmission map in operation 920, generate haze-free images by removing haze from the input image based respectively on the transformed transmission maps in operation 930, and generate an output image by blending the generated haze-free images in operation 940. In an example, a more detailed description of the image processing method described above with reference to FIG. 9 includes the operations described above with reference to FIGS. 1 through 8 and what is to be described hereinafter with reference to FIGS. 10 through 12. Thus, a repeated and detailed description will be omitted here for brevity.

Figure 10:
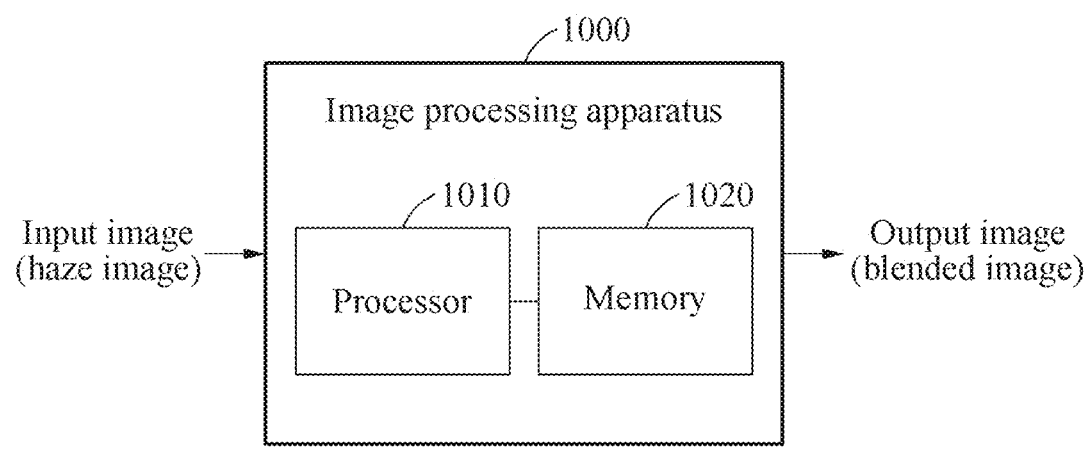
FIG. 10 illustrates an example of an image processing apparatus for haze removal.

FIG. 10 illustrates an example of an image processing apparatus for haze removal. Referring to FIG. 10, an image processing apparatus 1000 may include a processor 1010 (e.g., one or more processors) and a memory 1020 (e.g., one or more memories). The image processing apparatus 1000 may generate an output image by removing haze from an input image. The image processing apparatus 1000 may generate various radiances using various filters and generate the output image by blending the generated radiances. The input image may be a haze image, and the output image may be a blended image. For example, the output image may be used as data for ADAS. In an example, the image processing apparatus 1000 corresponds to, or is included in, the image processing apparatus 100.

The memory 1020 may be connected to the processor 1010, and store instructions executable by the processor 1010 and data to be processed by the processor 1010 or data processed by the processor 1010. The memory 1020 may include a non-transitory computer-readable medium, for example, a high-speed random-access memory (RAM) and/or nonvolatile computer-readable storage medium (e.g., at least one disk storage device, a flash memory device, or other nonvolatile solid-state memory devices).

The processor 1010 may execute instructions to perform one or more, or all, of the methods and operations described above with reference to FIGS. 1 through 9. For example, the processor 1010 may determine a source transmission map based on a dark channel map of an input image, determine transformed transmission maps by applying filters of different characteristics to the determined source transmission map, generate haze-free images by removing haze from the input image based respectively on the transformed transmission maps, and generate an output image by blending the generated haze-free images.

Figure 11:
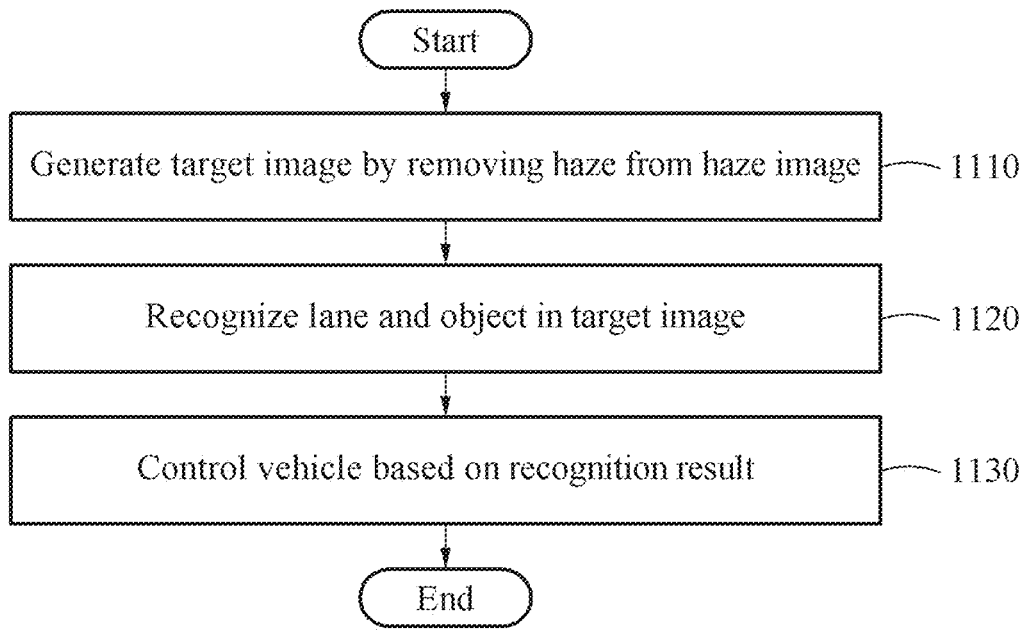
FIG. 11 illustrates an example of a subsequent method after haze removal.

FIG. 11 illustrates an example of a subsequent method after haze removal. As described above, when an output image is generated after haze is removed from an input image, the generated output image may be used for various image analyses. The output image will be hereinafter described as being used as data for ADAS. Operations 1110 through 1130 to be described hereinafter with reference to FIG. 11 may be performed by a vehicle control apparatus. The vehicle control apparatus may be provided in a vehicle and configured to control various functions for the vehicle including, for example, traveling-related functions such as acceleration, steering, and braking, and additional functions such as door opening and closing, window opening and closing, and airbag deployment.

Referring to FIG. 11, in operation 1110, the vehicle control apparatus may generate a target image by removing haze from a haze image. The target image may correspond to an output image. In operation 1120, the vehicle control apparatus may recognize a lane and an object in the target image. As an amount of information of the target image is improved by the haze removal, a recognition rate of the lane and the object may be improved. In operation 1130, the vehicle control apparatus may control the vehicle based on a result of the recognizing. For example, the vehicle control apparatus may control the traveling-related functions and/or the additional functions of the vehicle that are described above. Based on such a recognition result, the vehicle control apparatus may perform, for example, adaptive cruise control (ACC), autonomous emergency braking (AEB), blind spot detection (BSD), lane change assistance (LCA), and the like.

Figure 12:
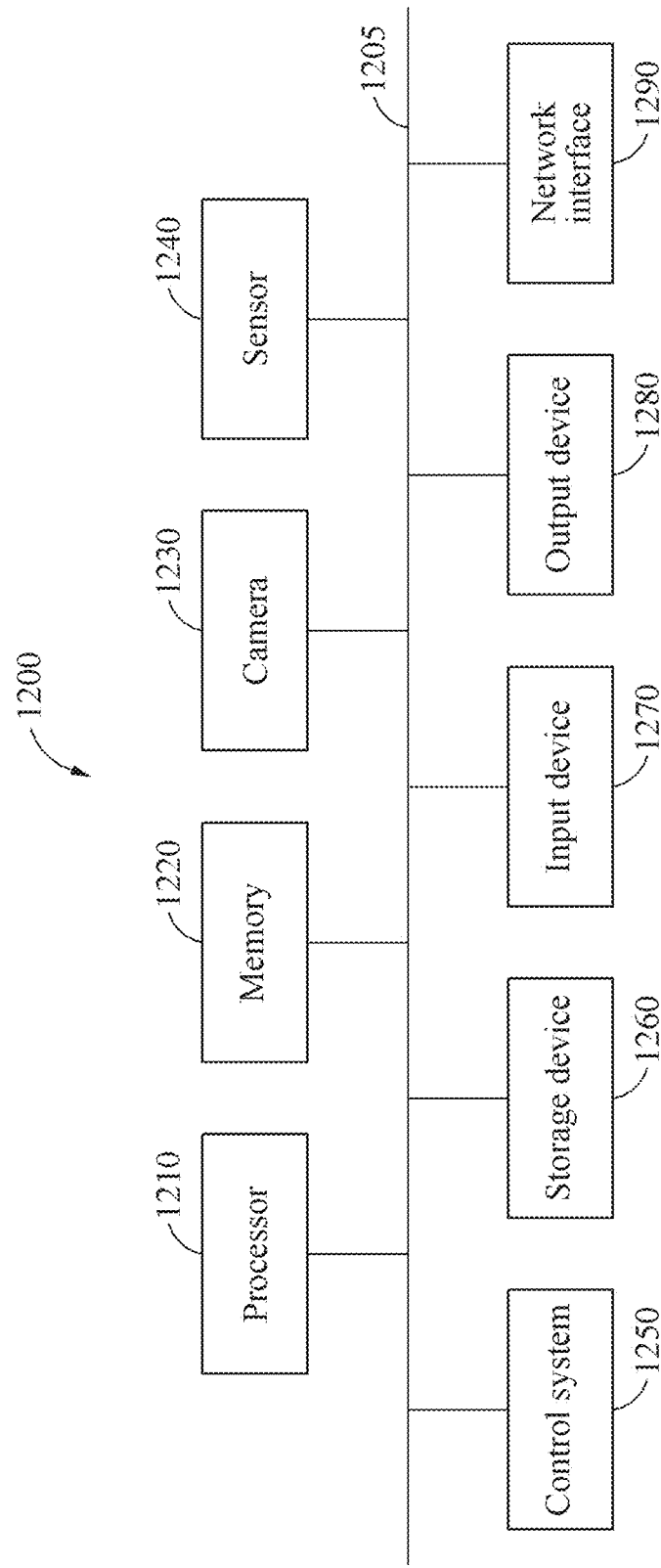
FIG. 12 illustrates an example of an electronic apparatus.

FIG. 12 illustrates an example of an electronic apparatus. Referring to FIG. 12, an electronic apparatus 1200 may include a processor 1210 (e.g., one or more processors), a memory 1220 (e.g., one or more memories), a camera 1230, a sensor 1240, a control system 1250, a storage device 1260, an input device 1270, an output device 1280, and a network interface 1290. The processor 1210, the memory 1220, the camera 1230, the sensor 1240, the control system 1250, the storage device 1260, the input device 1270, the output device 1280, and the network interface 1290 may communicate with one another through a communication bus 1205. In an example, the electronic apparatus 1200 corresponds to, or is included in, either of the image processing apparatus 100 and the image processing apparatus 1000.

The electronic apparatus 1200 may generate an output image by removing haze from an input image and perform subsequent operations based on the output image. For example, the electronic apparatus 1200 may correspond to the vehicle control apparatus described above with reference to FIG. 11, and perform subsequent operations for a vehicle, for example, traveling function control and additional function control. For example, the electronic apparatus 1200 may include the image processing apparatus 100 of FIG. 1 in terms of structure and/or function. For example, the electronic apparatus 1200 may be embodied as at least a portion of a mobile device (e.g., a mobile phone, a smartphone, a personal digital assistant (PDA), a netbook, a tablet computer, and a laptop computer), a wearable device (e.g., a smart watch, a smart band, and smart eyeglasses), a computing device (e.g., a desktop and a server), a security device (e.g., a door lock), and a vehicle (e.g., a smart vehicle).

The processor 1210 may execute functions and instructions in the electronic apparatus 1200. For example, the processor 1210 may process instructions stored in the memory 1220 and/or the storage device 1260. In an example, the processor 1210 may generate an output image by removing haze from an input image, and generate a control instruction on traveling of a vehicle based on the generated output image. In addition, the processor 1210 may perform one or more, or all, of the methods or operations described above with reference to FIGS. 1 through 11.

The memory 1220 may store data for haze removal. The memory 1220 may include a non-transitory computer-readable storage medium or device. The memory 1220 may store instructions to be executed by the processor 1210, and store related information while software or an application is being executed by the electronic apparatus 1200.

The camera 1230 may capture a video image and/or a still image (or a photograph). For example, the camera 1230 may be installed in a vehicle and configured to capture an image of the surroundings of the vehicle in a preset direction (e.g., front, side, rear, upward, and downward), and generate an image associated with traveling of the vehicle. In an example, the camera 1230 may provide a three-dimensional (3D) image including depth information of objects.

The sensor 1240 may sense visual, auditory, and tactile information associated with the electronic apparatus 1200. For example, the sensor 1240 may include an ultrasonic sensor, a radio detection and ranging (radar) sensor, and a light detection and ranging (lidar) sensor. The control system 1250 may control a vehicle based on a control instruction of the processor 1210. For example, the control system 1250 may physically control various functions for the vehicle that include traveling functions such as acceleration, steering, and braking, and additional functions such as door opening and closing, window opening and closing, and airbag deployment.

The storage device 1260 may include a non-transitory computer-readable storage medium or device. In an example, the storage device 1260 may store a greater amount of information for a longer period of time compared to the memory 1220. For example, the storage device 1260 may include a magnetic hard disk, an optical disc, a flash memory, a floppy disk, or a nonvolatile memory of another type that is well-known in a related technical field.

The input device 1270 may receive an input from a user through a traditional input method using a keyboard and a mouse, and a new input method using a touch input, a voice input, and an image input. The input device 1270 may include, for example, a keyboard, a mouse, a touchscreen, a microphone, and other devices that may detect the input from the user and transmit the detected input to the electronic apparatus 1200.

The output device 1280 may provide an output of the electronic apparatus 1200 to a user through a visual, auditory, or tactile channel. The output device 1280 may include, for example, a display, a touchscreen, a speaker, a vibration generator, and other devices that may provide the user with the output. The network device 1290 may communicate with an external device through a wired or wireless network.

The image processing apparatuses, the vehicle control apparatuses, the electronic apparatuses, processors, memories, cameras, sensors, control systems, storage devices, input devices, output devices, network interfaces, image processing apparatus 100, image processing apparatus 1000, processor 1010, memory 1020, electronic apparatus 1200, bus 1205, processor 1210, memory 1220, camera 1230, sensor 1240, control system 1250, storage device 1260, input device 1270, output device 1280, network interface 1290, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An image processing method, comprising:
   determining a source transmission map based on a dark channel map of an input image;
   determining transformed transmission maps by applying different filters to the determined source transmission map;
   generating haze-free images by removing haze from the input image based respectively on the determined transformed transmission maps; and
   generating an output image,
   wherein the haze-free images comprise:
     a first haze-free image for determining a flat region of the output image; and
     a second haze-free image for determining a strong edge region of the output image, and
   wherein the generating of the output image comprises:
     determining an edge map by detecting an edge in the input image;

generating first transformed haze-free images of different scales by performing a pyramid transformation on the first haze-free image;
generating second transformed haze-free images of different scales by performing another pyramid transformation on the second haze-free image;
generatinq the blended intermediate images by blending the first transformed haze-free images and the second transformed haze-free images based on the edge map; and
generating the output image based on the blended intermediate images.

2. The method of claim 1, wherein the transformed transmission maps and the haze-free images are based on a size of a single mask of the source transmission map.

3. The method of claim 1, wherein the filters comprise:
the first filter being configured to restore a texture; and
a second filter configured to suppress a halo artifact.

4. The method of claim 3, wherein the first filter comprises a multi-directional kernel-based filter, and the second filter comprises a guided filter.

5. The method of claim 1, wherein the generating of the output image comprises:
determining a blending weight based on edges in the input image; and
performing the blending based on the determined blending weight.

6. The method of claim 1, wherein the first haze-free image comprises the flat region including a restored texture; and
the second haze-free image comprises the strong edge region including a suppressed halo artifact.

7. The method of claim 1, wherein the blending comprises:
blending a first transformed haze-free image and a second transformed haze-free image by assigning a greater weight to an edge region in the second transformed haze-free image than a weight assigned to the edge region in the first transformed haze-free image, wherein the edge region is determined based on the edge map.

8. The method of claim 1, wherein the generating of the output image comprises:
generating the output image by performing an inverted pyramid transformation on the blended intermediate images.

9. The method of claim 1, wherein the determining of the edge map comprises:
determining the edge map by performing a morphological operation on the detected edge of the input image.

10. A non-transitory computer-readable storage medium storing instructions that, when executed by a processor, configure the processor to perform the method of claim 1.

11. An image processing apparatus, comprising:
a processor configured to:
determine a source transmission map based on a dark channel map of an input image;
determine transformed transmission maps by applying different filters to the determined source transmission map;
generate haze-free images by removing haze from the input image based respectively on the determined transformed transmission maps; and
generate an output image,
wherein the haze-free images comprise:
a first haze-free image for determining a flat region of the output image; and
a second haze-free image for determining a strong edge region of the output image,
wherein, for the generating of the output image, the processor is configured to:
determine an edge map by detecting an edge in the input image;
generate first transformed haze-free images of different scales by performing a pyramid transformation on the first haze-free image;
generate second transformed haze-free images of different scales by performing another pyramid transformation on the second haze-free image;
generate blended intermediate images by blending the first transformed haze-free images and the second transformed haze-free images based on the edge map; and
generate the output image based on the blended intermediate images.

12. The apparatus of claim 11, wherein the transformed transmission maps and the haze-free images are based on a size of a single mask of the source transmission map.

13. The apparatus of claim 11, wherein the filters comprise:
the first filter being a multi-directional kernel-based filter configured to restore a texture; and
a guided filter configured to suppress a halo artifact.

14. The apparatus of claim 11, wherein the processor is further configured to determine a blending weight, based on a detected edge in the input image, by performing a morphological operation on the detected edge.

15. The apparatus of claim 11, further comprising:
a camera configured to generate the input image; and
a control system configured to control a vehicle based on a generated control instruction,
wherein the processor is configured to generate the control instruction based on the generated output image, and the apparatus is a vehicle control apparatus.

16. The apparatus of claim 11 further comprising a memory storing instructions that, when executed by the processor, configure the processor to perform the determining of the source transmission map, the determining of the transformed transmission maps, the generating of the haze-free images, and the generating of the output image.

17. A vehicle control apparatus, comprising:
a camera configured to generate an input image of surroundings of a vehicle;
a processor configured to
determine a source transmission map based on a dark channel map of the input image,
determine transformed transmission maps by applying different filters to the determined source transmission map,
generate haze-free maps by removing haze from the input image based respectively on the determined transformed transmission maps,
generate an output image based on the generated haze-free maps, and
generate a control instruction for traveling of the vehicle based on the generated output image; and
a control system configured to control the vehicle based on the generated control instruction,
wherein the haze-free maps comprise:
a first haze-free map for determining a flat region of the output image; and
a second haze-free map for determining a strong edge region of the output image, wherein, for the generating of the output image, the processor is configured to:
  determine an edge map by detecting an edge in the input image; and
  generate first transformed haze-free maps of different scales by performing a pyramid transformation on the first haze-free map;
  generate second transformed haze-free maps of different scales by performing a pyramid transformation on the second haze-free map; and
  generate blended intermediate images by blending the first transformed haze-free maps and the second transformed haze-free maps based on the edge map; and
  generate the output image based on the blended intermediate images.

18. The apparatus of claim 17, wherein the filters comprise:
  a multi-directional kernel-based filter configured to restore a texture; and
  a guided filter configured to suppress a halo artifact.

19. The apparatus of claim 17, wherein, for the generating of the output image, the processor is configured to:
  determine a blending weight based on edges in the input image; and
  perform the blending based on the determined blending weight.

20. An image processing method, comprising:
  determining a source transmission map, based on a dark channel map of an input image generated based on a mask of a predetermined size;
  determining first and second transformed transmission maps by respectively applying a multi-directional kernel-based filter and a guided filter to the source transmission map;
  generating first and second haze-free images by removing haze from the input image based respectively on the first and second transformed transmission maps; and
  generating an output image based on an edge map of the input image,
  wherein the first haze-free image is used for determining a flat region of the output image, and the second haze-free image is used for determining a strong edge region of the output image,
  wherein the generating of the output image comprises:
  determining the edge map by detecting an edge in the input image; and
  generatinq first transformed haze-free images of different scales by performing a pyramid transformation on the first haze-free image;
  generatinq second transformed haze-free images of different scales by performing a pyramid transformation on the second haze-free image; and
  generatinq blended intermediate images by blending the first transformed haze-free images and the second transformed haze-free images based on the edge map; and
  generatinq the output image based on the blended intermediate images.

* * * * *